United States Patent
Vayanos et al.

(10) Patent No.: US 8,144,735 B2
(45) Date of Patent: Mar. 27, 2012

(54) TRANSMISSION OF SIGNALING INFORMATION FOR BROADCAST AND MULTICAST SERVICES

(75) Inventors: Alkinoos Hector Vayanos, San Diego, CA (US); Francesco Grilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1448 days.

(21) Appl. No.: 11/054,771

(22) Filed: Feb. 9, 2005

(65) Prior Publication Data

US 2005/0195852 A1    Sep. 8, 2005

Related U.S. Application Data

(60) Provisional application No. 60/544,147, filed on Feb. 10, 2004.

(51) Int. Cl.
- *H04H 20/71* (2008.01)
- *H04W 4/00* (2009.01)
- *H04L 12/28* (2006.01)
- *H04J 3/26* (2006.01)
- *H04J 3/12* (2006.01)

(52) U.S. Cl. ........ 370/522; 370/312; 370/338; 370/390; 370/432

(58) Field of Classification Search .......... 370/390, 370/347, 328, 312, 338, 466, 465, 395.6; 455/426.1, 414.1, 450

See application file for complete search history.

(56) References Cited

U.S. PATENT DOCUMENTS

| | | | |
|---|---|---|---|
| 5,598,417 A * | 1/1997 | Crisler et al. | 370/348 |
| 6,633,757 B1 * | 10/2003 | Hermann et al. | 455/414.1 |
| 6,728,300 B1 | 4/2004 | Sarkar et al. | 375/147 |
| 6,985,473 B2 * | 1/2006 | Vayanos et al. | 370/342 |
| 6,999,773 B2 * | 2/2006 | Nguyen et al. | 455/450 |
| 7,177,658 B2 * | 2/2007 | Willenegger et al. | 455/522 |

(Continued)

FOREIGN PATENT DOCUMENTS

AU    2003235065    3/2004

(Continued)

OTHER PUBLICATIONS

"$3^{rd}$ Generation Partnership Project; Technical Specification Group Radio Access Network; Radio Interface for Broadcast/Multicast Services (Release 1999)." 3GPP TR 25.925 V3.4.0, Mar. 2001, pp. 1-31, XP002191629.

(Continued)

*Primary Examiner* — Kevin C Harper
*Assistant Examiner* — Thinh Tran
(74) *Attorney, Agent, or Firm* — Larry Moskowitz

(57) ABSTRACT

Techniques for transmitting signaling information for broadcast and multicast services are described. A base station transmits signaling information for each service in accordance with a schedule that includes a repetition period and a modification period. The signaling information is sent in each repetition period to allow wireless devices to quickly obtain this information. Changes to the critical signaling information are permitted at the start of each modification period, which is an integer multiple of the repetition period. Whenever the critical signaling information for a given service is changed in a given modification period, a notification indicator for the service is set in an entire preceding modification period to inform the wireless devices of the impending change. The wireless devices can detect the notification indicator being set in the preceding modification period and can retrieve the updated critical signaling information in the following modification period.

43 Claims, 10 Drawing Sheets

U.S. PATENT DOCUMENTS

| | | | |
|---|---|---|---|
| 7,623,542 B2 * | 11/2009 | Yonge et al. | 370/445 |
| 2002/0090937 A1 * | 7/2002 | Laroia et al. | 455/421 |
| 2003/0119452 A1 | 6/2003 | Kim et al. | |
| 2003/0134651 A1 | 7/2003 | Hsu | |
| 2003/0157953 A1 | 8/2003 | Das et al. | |
| 2003/0211860 A1 | 11/2003 | Sarkkinen et al. | |
| 2004/0087320 A1 * | 5/2004 | Kim et al. | 455/458 |
| 2004/0103435 A1 * | 5/2004 | Yi et al. | 725/81 |
| 2004/0227618 A1 * | 11/2004 | Hwang et al. | 340/7.46 |
| 2005/0084036 A1 * | 4/2005 | Luo et al. | 375/316 |

FOREIGN PATENT DOCUMENTS

| | | |
|---|---|---|
| AU | 2003252554 | 3/2004 |
| CA | 2690467 A1 | 7/2005 |
| DE | 19623299 | 1/1998 |
| EP | 1185125 | 3/2002 |
| EP | 1351538 A1 | 10/2003 |
| KR | 20050081836 A | 8/2005 |
| KR | 20050106845 A | 11/2005 |
| KR | 100823903 | 4/2008 |

OTHER PUBLICATIONS

International Search Report—PCT-/US05/004862—International Search Authority—European Patent Office—Jun. 17, 2005.

Written Opinion, PCT/US2005/004862, International Searching Authority, European Patent Office, Jun. 17, 2005.

International Preliminary Report on Patentability, PCT/US2005/004862, International Preliminary Examining Authority, United States, Sep. 26, 2006.

3GPP TSG-RAN2 Meeting #40 "Discussion and Decision" Sophia-Antipolis, France, Jan. 12-16, 2004, pp. 1-7.

3GPP TSG-RAN Working Group 2 Meeting "Transmission of MBMS Control Information", Sophia Antipolis, France, Aug. 6-10, 2003 pp. 2-6.

TSG-RAN Working Group 2 #37 "MBMS Notification Based on SIB" Budapest, Hungary, Aug. 25-29, 2003 pp. 2-5.

3GPP TSG-RAN1 Adhoc "Physical Layer Issues for MBMS Notification", Espoo, Finland, Jan. 27-30, 2004 pp. 1-7.

LG Electronics Inc., "MBMS Notificatin Based on SIB", 3GPP TSG-RAN Working Group 2 #37, Aug. 29, 2003, R2-031650, URL, http://www.3gpp.org/FTP/tsg_ran/WG2_RL2ITSGR2_37/Docs/R2-031650. zip.

Siemens, "Transmission of MBMS Control Information", 3GPP TSG-RAN Working Group 2 Meeting, Aug. 10, 2003, R2-032139, URL, http://www.3gpp.org/ftp/tsg_ran/WG2_RL2ITSGR2_38/Docs/R2-032139. zip.

European Search Report—EP10157655—Search Authority—Berlin—Jun. 6, 2011.

Taiwan Search Report —TW094104219—TIPO—May 4, 2011.

Qualcomm, 3GPP TSG-RAN WG2 meeting #41, "MBMS Notification and counting procedures", Feb. 16-20, 204, pp. 1-6.

* cited by examiner

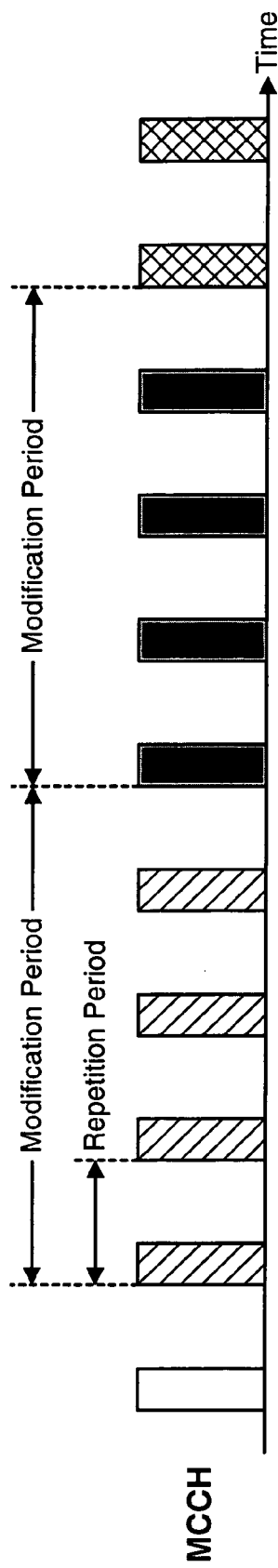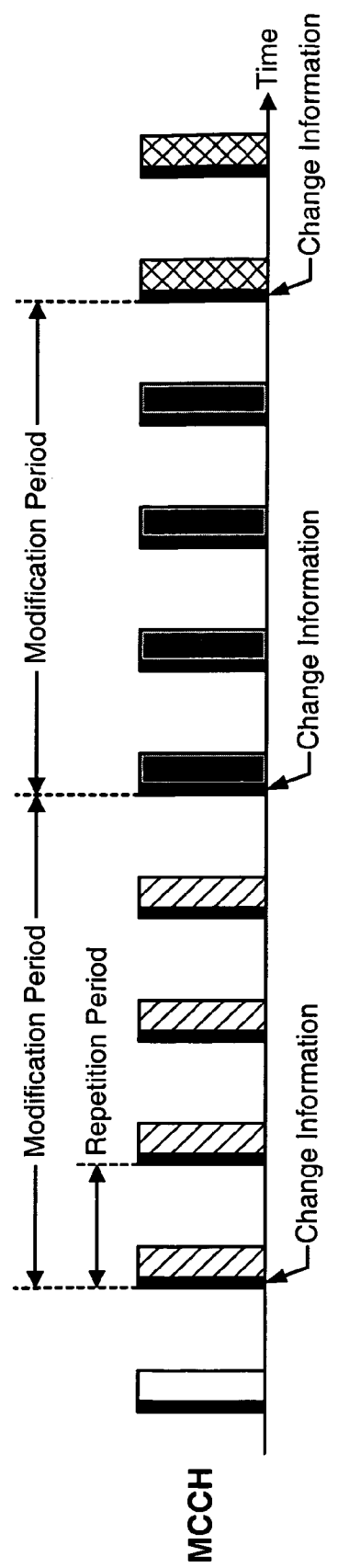
FIG. 3A
FIG. 3B

US 8,144,735 B2

TRANSMISSION OF SIGNALING INFORMATION FOR BROADCAST AND MULTICAST SERVICES

CLAIM OF PRIORITY UNDER 35 U.S.C. §119

The present Application for Patent claims priority to Provisional Application Ser. No. 60/544,147, entitled "Multimedia Broadcast/Multicast Service (MBMS) Notification and Counting Procedures," filed Feb. 10, 2004, and assigned to the assignee hereof and hereby expressly incorporated by reference herein.

BACKGROUND

I. Field

The present invention relates generally to communication, and more specifically to techniques for transmitting signaling information for broadcast and multicast services in a communication system.

II. Background

A communication system may provide unicast, multicast, and/or broadcast services. A unicast service provides point-to-point communication between at least one base station and a specific wireless device. A multicast service provides point-to-multipoint communication between at least one base station and a group of wireless devices. A broadcast service provides point-to-multipoint communication between at least one base station and all wireless devices within a designated broadcast area. Some examples of multicast and broadcast services include news and data services, subscription-based services, push-to-talk, and so on. Multicast and broadcast services may send data to wireless devices sporadically, periodically, or continuously.

The system may need to send signaling information for the broadcast and multicast services supported by the system. This signaling information may also be called overhead information, system information, and so on, and may include control information, configuration information, and other pertinent information used to receive services. The system may transmit the signaling information on a control channel. A wireless device receiving one or more services would then monitor the control channel for signaling information sent for the service(s) being received. It is desirable for the wireless device to be able to receive pertinent signaling information from the control channel in a quick and efficient manner in order to conserve battery power and attain other benefits.

There is therefore a need in the art for techniques to transmit signaling information for broadcast and multicast services in a manner to facilitate efficient reception of this information.

BRIEF DESCRIPTION OF THE DRAWINGS

FIGS. 3A and 3B show transmissions on a MCCH based on a schedule.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
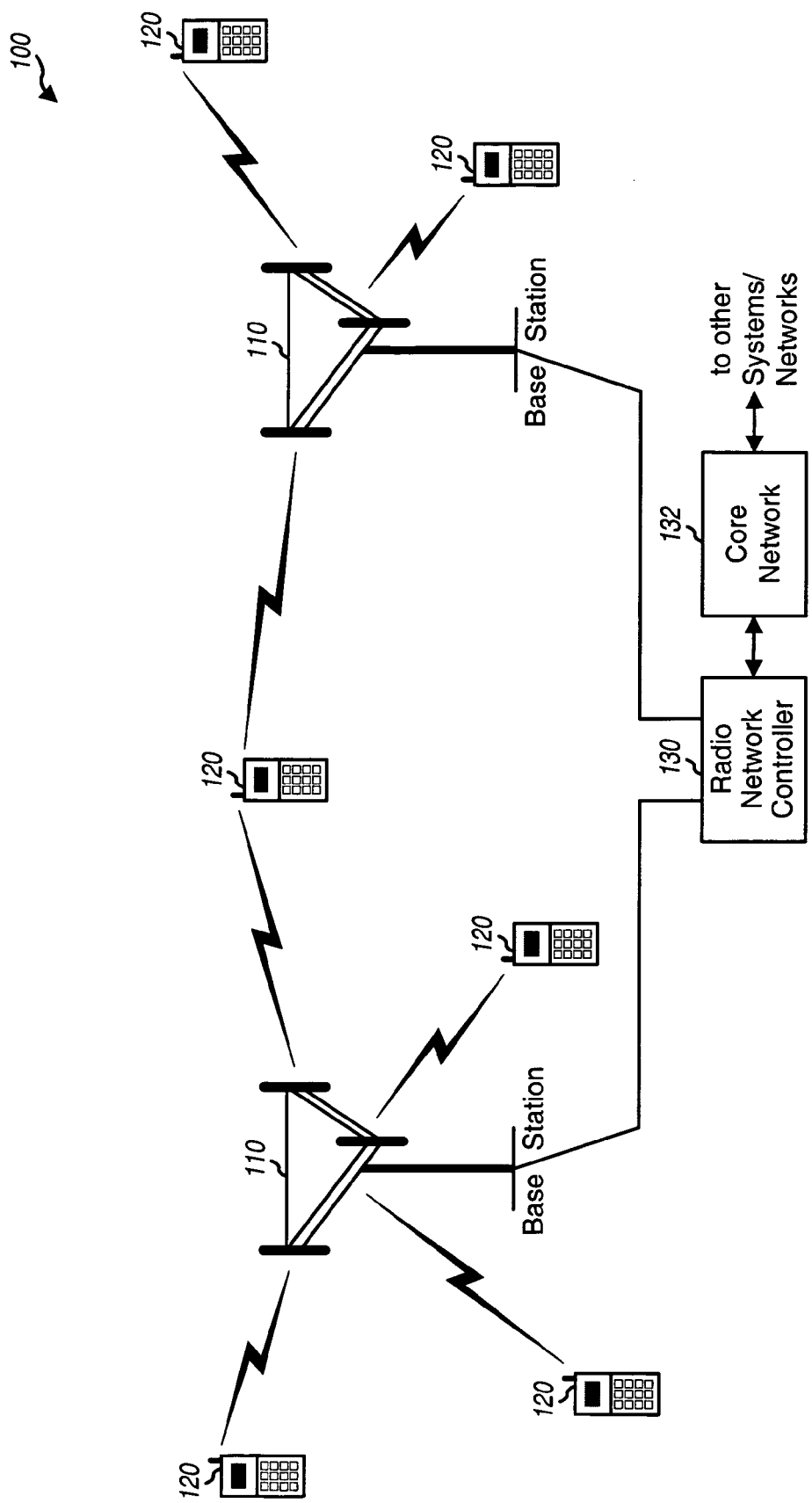
FIG. 1 shows a wireless communication system.

FIG. 1 shows a wireless communication system 100 capable of supporting broadcast and multicast services. System 100 includes base stations 110 that communicate with wireless devices 120. For simplicity, only two base stations 110 and six wireless devices 120 are shown in FIG. 1. A base station is a fixed station and may also be called a Node B, a base transceiver subsystem (BTS), an access point, or some other terminology. A wireless device may be fixed or mobile and may also be called a user equipment (UE), a mobile station, a terminal, or some other terminology.

A radio network controller (RNC) 130 couples to base stations 110 and provides coordination and control for these base stations. RNC 130 may also be called a base station controller (BSC) or some other terminology. A core network (CN) 132 couples to RNC 130 and other systems and networks, such as a public switched telephone network (PSTN), a packet switched data network, and so on. Core network 132 interconnects system 100 with these other systems and networks.

System 100 may be a Code Division Multiple Access (CDMA) system, a Time Division Multiple Access (TDMA) system, a Frequency Division Multiple Access (FDMA) system, an Orthogonal Frequency Division Multiple Access (OFDMA) system, or some other multiple access system. A CDMA system may implement one or more CDMA radio access technologies (RATs) such as Wideband-CDMA (W-CDMA) and cdma2000. cdma2000 covers IS-2000, IS-856, and IS-95 standards. A TDMA system may implement one or more TDMA RATs such as Global System for Mobile Communications (GSM). These various RATs and standards are well known in the art. UMTS is a system that uses W-CDMA and/or GSM as radio access technologies and is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the signaling transmission techniques are specifically described below for UMTS. These techniques may be used for multimedia broadcast multicast service (MBMS) in UMTS.

In UMTS, a Page Indicator Channel (PICH) is used to send paging indicators to idle wireless devices. An idle wireless device is a wireless device for which the PICH and MICH are useful. An idle wireless device may be a wireless device operating in an idle mode, a wireless device operating in an RRC connected mode but in a CELL_PCH/URA_PCH state. The paging indicators for each idle wireless device indicate whether messages might be sent on a Paging Channel (PCH) for the wireless device. The PCH is a transport channel that is carried in a Secondary Common Control Physical Channel (S-CCPCH). Each idle wireless device monitors the PICH for its paging indicators. If these paging indicators are set to '1', then the wireless device processes the S-CCPCH to look for any messages sent for the wireless device.

Figure 2A:
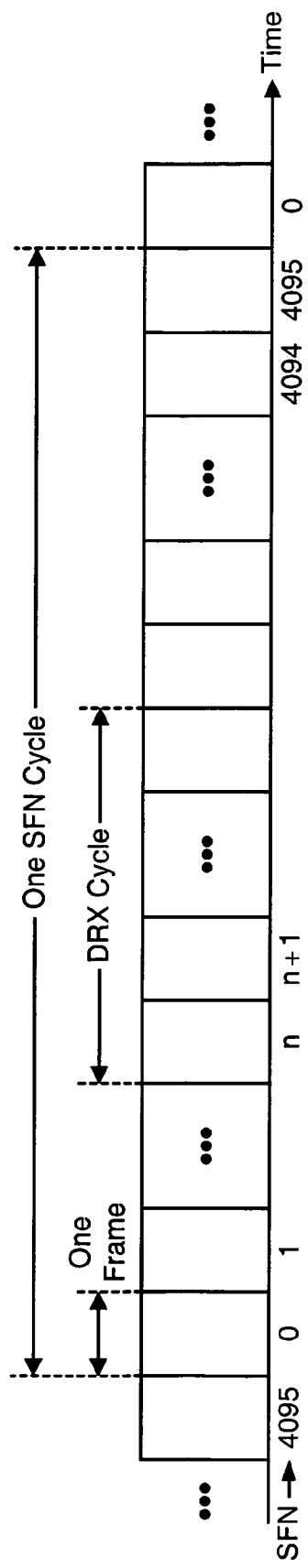
FIG. 2A shows the format of a PICH in Universal Mobile Telecommunication System (UMTS).

FIG. 2A shows the format of the PICH in UMTS. The PICH is partitioned into frames, with each frame having a duration of 10 millisecond (ms). Each frame is identified by a 12-bit system frame number (SFN) that is simultaneously transmitted on a Primary CCPCH (P-CCPCH). The SFN is reset to 0 at a specific time, is incremented by one for each frame thereafter, and wraps around to zero after reaching the maximum value of 4095.

Each idle wireless device is assigned paging occasions, which are specific frames in which the wireless device can receive its paging indicators. The paging occasions for each wireless device are separated by a time interval called a DRX (discontinuous receiving mode) cycle. The DRX cycle is configurable for each wireless device and is typically 1.28 seconds. In general, the DRX cycle can range from 80 milliseconds (ms) to 5.12 seconds, or from 8 frames to 512 frames. The paging occasions for each wireless device are determined based on several parameters including an International Mobile Subscriber Identifier (IMSI), which is an identifier that is unique for each wireless device. Different wireless devices with different IMSIs may be assigned different paging occasions even if they have the same DRX cycle.

Figure 2B:
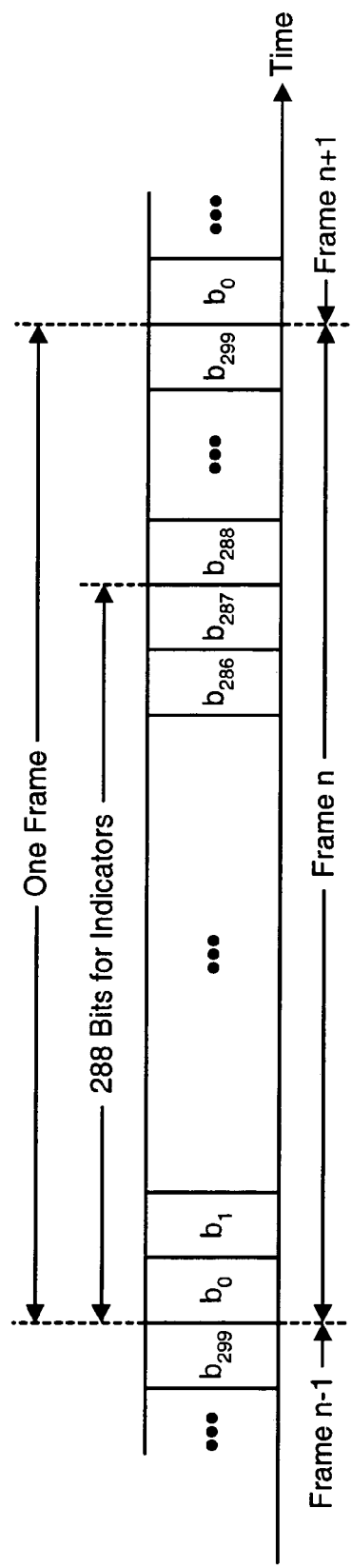
FIG. 2B shows the format of one frame of the PICH.

FIG. 2B shows the format of one frame for the PICH. Each PICH frame includes 300 bits, which are labeled as bits $b_0$ through $b_{299}$. The first 288 bits are used for Np paging indicators, and the last 12 bits are reserved. The number of paging indicators (Np) in each PICH frame is configurable by the system and can take on a value of 18, 36, 72 or 144. Each paging indicator is sent in 288/Np consecutive bits in the PICH frame, where 288/Np can take on a value of 16, 8, 4 or 2. The 288/Np bits are all set to '1' if the paging indicator is equal to '1' and are set to '0' if the paging indicator is equal to '0'. The Np paging indicators are sent in Np paging indicator locations that are numbered from 0 through Np-1 (not shown in FIG. 2B).

Each idle wireless device is mapped to a specific PI value based on its IMSI. The wireless device is also assigned a paging indicator in each paging occasion. This paging indicator is sent at a location that is determined based on a hash function $f_{pi}(PI, SFN)$. The location of the paging indicator for the wireless device is thus determined by both the IMSI for the wireless device and the SFN for the paging occasion.

In UMTS, an MBMS Indicator Channel (MICH) is used to send MBMS notification indicators (or simply, notification indicators) that indicate whether updated signaling information is being sent on an MBMS point-to-multipoint Control Channel (MCCH). The MCCH is a transport channel that is also carried in the S-CCPCH. The signaling information on the MCCH allows the wireless devices to receive an MBMS point-to-multipoint Traffic Channel (MTCH). The signaling information may indicate, for example, which services are active, how to decode the MTCH, whether soft combining is possible, and so on. The MTCH is a transport channel that carries traffic data or content for the services.

The MICH has a format that is similar to the PICH format shown in FIG. 2B. Each MICH frame includes 300 bits, which are labeled as bits $b_0$ through $b_{299}$. The first 288 bits are used for Nn notification indicators, and the last 12 bits are reserved. The number of notification indicators (Nn) in each MICH frame is configurable by the system and can take on a value of 18, 36, 72 or 144. Each notification indicator is sent in 288/Nn consecutive bits in the MICH frame, where 288/Nn can take on a value of 16, 8, 4 or 2. The Nn notification indicators are sent in Nn indicator locations that are numbered from 0 through Nn-1. Notification indicators may also be sent using the last 12 bits in each PICH frame.

Each multicast/broadcast service is mapped to a specific NI value based on a Temporary Mobile Group Identity (TMGI) that identifies that service. The service is also assigned notification indicators, which are sent in locations determined based on a hash function $f_{ni}(NI, SFN)$. The locations of the notification indicators for the service are thus determined by both the TMSI for the service and the SFN for the frame. The notification indicators for the service are used to indicate whether updated signaling information is being sent on the MCCH for the service. Each wireless device monitors the notification indicators for all of the services desired by the wireless device (or "desired services"). Whenever the notification indicator for any desired service is set to '1', the wireless device further processes the S-CCPCH to look for updated signaling information sent for that service.

The MCCH carries signaling information used to support broadcast and multicast services. The wireless devices may need to read the MCCH for various reasons such as:

Start/end a service;

Change service specific re-location information;

Change S-CCPCH information (code, TFCS) for the MTCH;

Change radio bearer (RB) information for the MTCH; and

Start counting/re-counting as defined by UMTS and described below.

In an embodiment, signaling information is sent in accordance with a schedule on the MCCH. The MCCH schedule may be sent on a Broadcast Control Channel (BCCH) and made available to all wireless devices. In an embodiment, the MCCH schedule includes a repetition period, a modification period, and an access info period, which are described in Table 1.

TABLE 1

| Period | Definition | Duration |
|---|---|---|
| Repetition Period | The time interval in which signaling information is sent on the MCCH. | Any time duration. |
| Modification Period | The time at which critical signaling information can change, e.g., changes to the critical signaling information can be applied at the first MCCH transmission in a modification period. | Integer multiple of the repetition period. |
| Access Info Period | The time interval in which access information is sent on the MCCH | Integer divider of the repetition period. |

The MCCH schedule also identifies the specific frame or transmission time interval (TTI) containing the beginning of a MCCH transmission. The same MCCH schedule may be used for all services to simplify both transmission and reception of signaling information for the services, as described below. Alternatively, different services or different groups of services may use different MCCH schedules. The various parts of the MCCH schedule are described in further detail below.

Table 2 lists various channels used to support broadcast and multicast services.

TABLE 2

| Channel | Definition |
|---|---|
| BCCH | Carry the MCCH schedule and the configuration of the radio bearer carrying the MCCH. |

TABLE 2-continued

| Channel | Definition |
| --- | --- |
| MICH | Carry notification indicators that indicate whether updated critical signaling information is being sent on the MCCH. |
| MCCH | Carry signaling information for the services. |
| MTCH | Carry content for the services. |

The signaling information sent on the MCCH may be arranged into two categories called critical signaling information and non-critical signaling information. The signaling information may be service independent information and/or service specific information. The critical signaling information includes signal information that is needed to receive MBMS content for services. For example, the critical signaling information may include MBMS neighboring cell information, MBMS service information, and MBMS radio bearer information. The non-critical signaling information includes all signaling information that is not critical signaling information. For example, the non-critical signaling information may include MBMS access information. These various types of MBMS signaling information are described in a document 3GPP TS, 25.346, which is publicly available.

FIG. 3A shows an embodiment of signaling transmission on the MCCH. Signaling information for each service is sent periodically on the MCCH in every repetition period to allow wireless devices that just started monitoring the service to receive the information. These wireless devices may have just powered on, just become interested in the service, and/or just changed cells. For all of these scenarios (except possibly for the cell-change scenario), the wireless devices can tolerate relatively long delay in receiving the signaling information. The repetition period may thus be made relatively long to reduce signaling overhead. In general, the repetition period may be any time duration and may span any number of frames.

The signaling information may be sent on the MCCH starting in the first frame of each repetition period and for as many frames as needed. The repetition period thus identifies the beginning of a MCCH transmission. The duration of the MCCH transmission does not need to be specified and may be determined from a transport format combination indicator (TFCI) sent in the S-CCPCH. A wireless device can continue to process the S-CCPCH until the device determines that (1) all of the MCCH information has been received, (2) a TTI that does not include any MCCH data is received for the S-CCPCH, or (3) the received signaling information on the MCCH indicates that further reception of the MCCH is not required (e.g., if there are no changes to the signaling information for any of the desired services). The wireless device can stop processing the S-CCPCH for MCCH data upon encountering any one of the three conditions.

The modification period may span any number of repetition periods and represents the time at which critical signaling information may be changed. In FIG. 3A, different markings (e.g., diagonal hashing, grey shading, and cross hashing) are used for the MCCH in different modification periods and represent potentially different signaling information being sent on the MCCH. Time aligning the changes in the critical signaling information sent on the MCCH allows the wireless devices to know when it might be useful to read the MCCH. This time alignment also results in some additional delays as well as certain restrictions in sending the updated critical signaling information. The non-critical signaling information may be changed at any time, e.g., in any repetition period.

FIG. 3B shows another embodiment of signaling transmission on the MCCH. The signaling information for each service is sent periodically on the MCCH in every repetition period, and the critical signaling information may be changed in each modification period, as described above for FIG. 3A. At the beginning of each modification period, the system also transmits MBMS change information, which may include, e.g., the identifiers of the services whose critical signaling information is changed in that modification period. The change information may be sent at least once in each modification period. The wireless devices can read the change information and can quickly ascertain whether the device needs to read updated signaling information for any of the desired services.

A notification mechanism is used to inform the wireless devices of an upcoming change in the critical signaling information sent on the MCCH. In an embodiment, the notification mechanism is implemented using the MICH. The MICH carries notification indicators that prompt the wireless devices interested in the services mapped to these indicators to read the MCCH for updated signaling information. The notification indicators for all of the services may be sent in a manner that is highly tolerant to channel errors. The MICH carries a single bit of information for each service, and the wireless devices are not able to verify whether the information received on the MICH is correct (no CRC). Also, the MCCH is transmitted on the S-CCPCH using an RLC-unacknowledged mode (UM), and the wireless device may miss one or even two MCCH transmissions before decoding it correctly. The wireless device may have to wait for one or more repetition periods before being able to decode the critical information, and after all the effort, the wireless device may find out that it was a false alarm. A reliable notification helps to avoid unnecessary receptions of the MCCH.

Second, the notification indicators may be sent on the MICH in a manner to allow the wireless devices to detect the notification indicators during their paging occasions, which can reduce battery consumption. The notification indicators should also be sent such that wireless devices in various MBMS-related states can receive these indicators. These include wireless devices expecting a service to come on, wireless devices actively monitoring a service but interested in other services, and wireless devices that just turned on, or just moved from other cells, or are becoming interested in MBMS.

Figure 4:
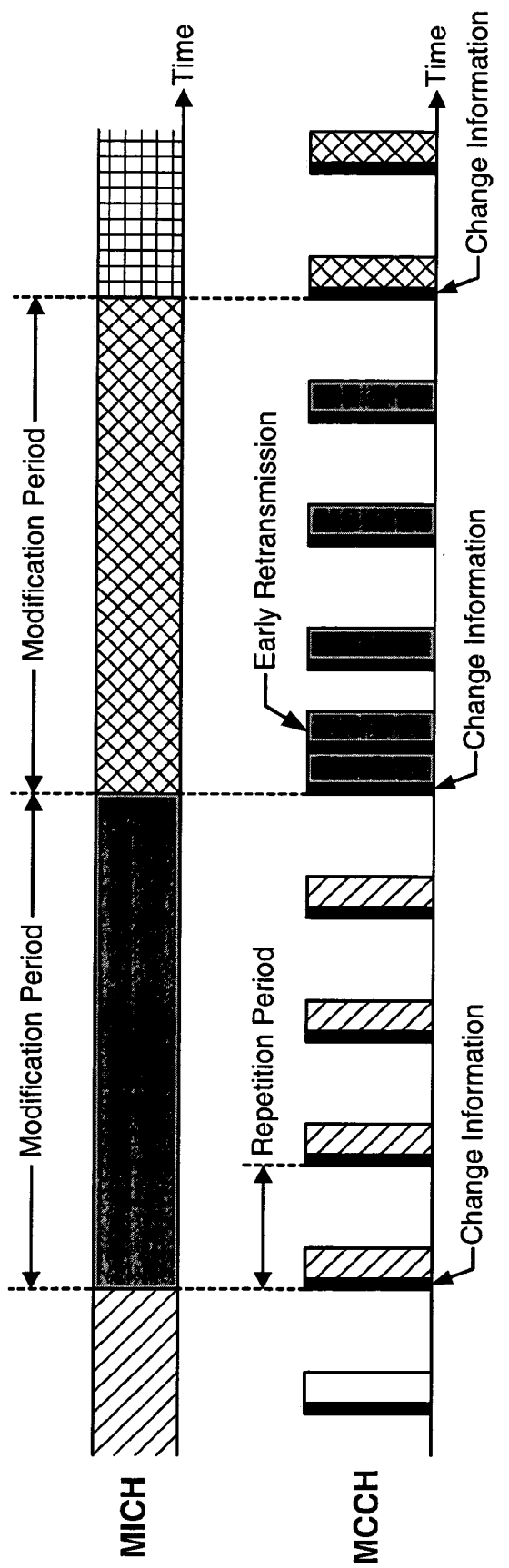
FIG. 4 shows exemplary transmissions on a MICH and MCCH.

FIG. 4 shows an embodiment of transmissions on the MICH and MCCH. Each service is assigned a notification indicator on the MICH in each frame. In an embodiment, the notification indicator for each service is set to '1' for the entire modification period preceding a change in the critical signaling information for that service.

The wireless devices can read the MICH in different frames (e.g., in their paging occasions) and can become aware of the need to read the MCCH in an asynchronous manner. The wireless devices are also aware of the MCCH schedule and are ready to start receiving the MCCH at the beginning of the next modification period. It is not necessary for the timing of the notification indicators sent on the MICH to convey any information about the timing of the MCCH, which is the case for the PICH and PCH since the timing of the PICH and PCH is related.

The wireless devices that have detected the notification indicator for a desired service being set in a prior modification period can read the MCCH at the start of the current modification period. The updated signaling information may be retransmitted shortly (e.g., immediately) after the first MCCH transmission in the current modification period, as shown in FIG. 4. This quick retransmission on the MCCH can improve reliability and ensure that all or most wireless devices can receive the updated signaling information on the MCCH as soon as possible.

Figure 5:
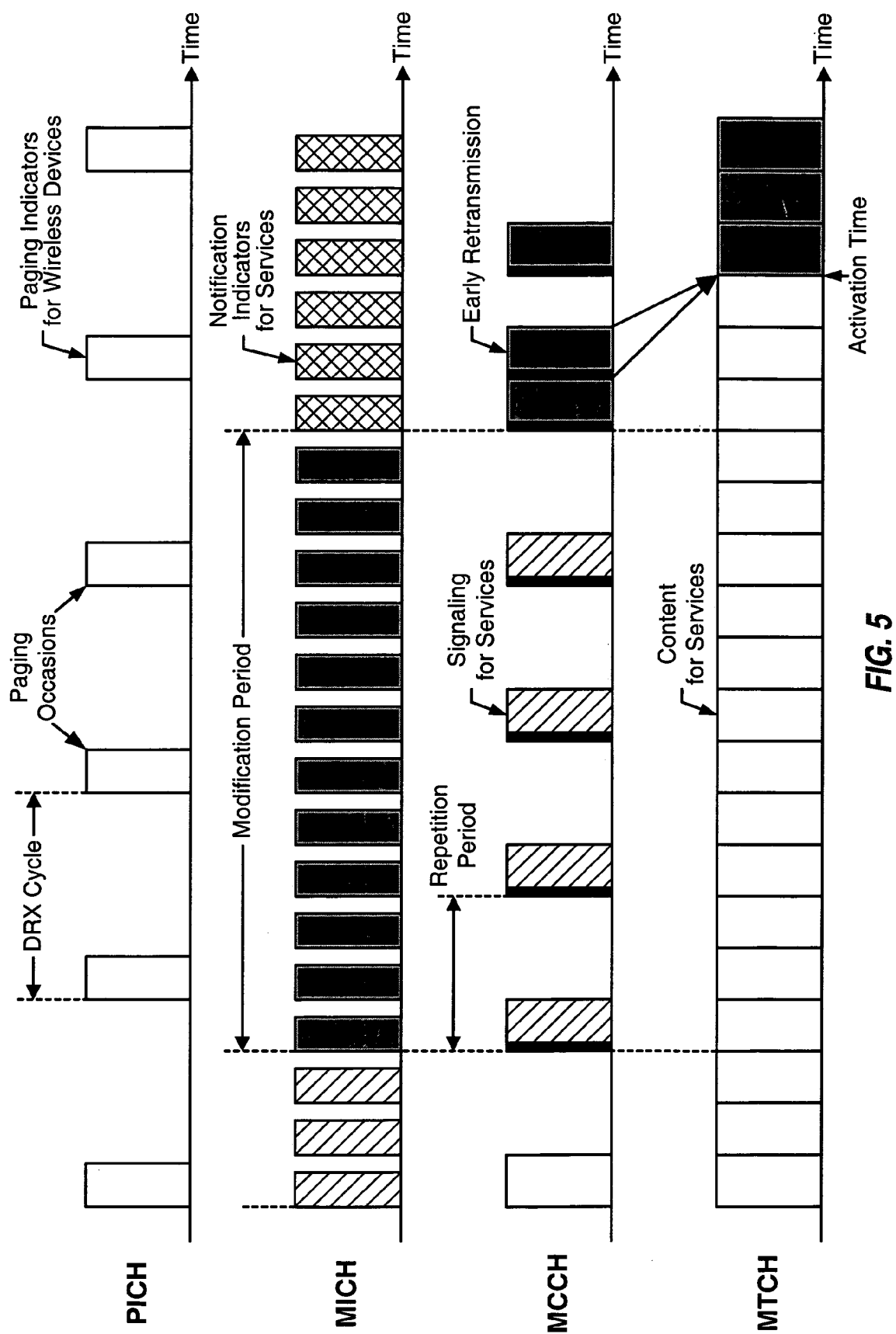
FIG. 5 shows exemplary transmissions on the PICH, MICH, MCCH and MTCH.

FIG. 5 shows exemplary transmissions on the PICH, MICH, MCCH and MTCH. Paging indicators for each idle wireless device are sent on the PICH in the paging occasions for the wireless device, as shown at the top of FIG. 5. The notification indicator for each service is sent in each frame on the MICH and is set to the same notification value (either '1' or '0') for the entire modification period. The notification indicator is set to '1' for the entire modification period immediately preceding a change in the critical signaling information for the service.

The modification period is selected to be sufficiently long so that all wireless devices (even wireless devices with the longest possible DRX cycle) can process the MICH and reliably detect at least one notification indicator for each desired service during the modification period. This allows most idle wireless devices to receive their paging indicators as well as the notification indicators for the desired services in their paging occasions, which can reduce battery consumption. A wireless device with a DRX cycle that is shorter than the modification period can read the MICH during its paging occasion in each DRX cycle. A wireless device with a DRX cycle that is longer than the modification period can wake up between its paging occasions to read the notification indicators sent on the MICH. The modification period may be selected to be equal to or longer than a predetermined minimum duration (e.g. 2 seconds) so that the wireless devices with long DRX cycles do not need to wake up too frequently. The DRX cycles for the wireless devices may also be limited to a predetermined maximum duration (e.g., 5.12 seconds). Depending on how the DRX cycle and the modification period are configured, a wireless device may be able to read one or multiple notification indicators for each desired service in each modification period.

Each wireless device monitors the notification indicators for the desired services. When the wireless device detects the notification indicator for a desired service being set, the wireless device attempts to read the MCCH at the beginning of the next modification cycle to look for updated critical signaling information for that service. The wireless device reads the MCCH for as long as it takes to at least decode the MBMS change information. The wireless device also reads the MCCH for as long as it takes to correctly decode the MCCH, or until the continuous transmission on the MCCH is interrupted. The wireless device is able to detect the end of the MCCH transmission using the TFCI for the S-CCPCH even if the device is unable to decode the S-CCPCH correctly. The wireless device may also terminate the processing of the MCCH if the MBMS change information indicates no changes to the critical signaling information for any of the desired services.

The updates in the signaling information sent on the MCCH may reflect important changes on the MTCH such as, e.g. re-configurations of the S-CCPCH or MTCH. The updated signaling information may need to be applied synchronously at the transmitter and the receiver in order to ensure smooth reception of the content sent on the MTCH. In that case, the updated signaling information may be associated with an activation time. This activation time indicates when the signaling information is to be applied. The activation time may be defined relative to the start of the modification cycle and may be given in units of repetition cycles, frames, and so on. This allows the activation time to be conveyed in an efficient manner. The updated signaling information and its activation time may be sent some amount of time in advance of the activation time to allow the wireless devices sufficient time to receive and apply the signaling information.

FIG. 5 also shows an early retransmission on the MCCH immediately after the first MCCH transmission in the modification period to improve reception of the updated signaling information. The first MCCH transmission and the early retransmission are both associated with the same activation time that occurs after the end of the early retransmission.

The wireless devices that start monitoring a given service between the time the updated signaling information is sent on the MCCH and the activation time will not be able to receive the ongoing service. However, these wireless devices will be aware of the impending change for the MTCH due to the activation time. Therefore, this time duration should not have a significant impact on performance as long as it is relatively short.

As shown in FIGS. 3A through 5, the schedule for the MCCH has the following features:
  Signaling information is repeated on the MCCH based on a repetition period;
  Changes in critical signaling information are not made in the middle of a modification period, which is multiple times the repetition period;
  Notification indicators on the MICH are set for the entire modification period preceding a change in critical signaling information sent on the MCCH;
  The wireless devices monitor the MICH at their convenience but ensure good detection probability within any modification period; and
  Upon detecting the notification indicator being set on the MICH, the wireless devices start processing the MCCH in the next modification period until the updated signaling information on the MCCH is decoded correctly.

UMTS utilizes a counting/re-counting procedure to determine the number of wireless devices receiving a given MBMS service. The system may use this information to determine an optimal transmission mechanism for the service, e.g., to decide whether to send the service using a point-to-point (p-t-p) channel or a point-to-multipoint (p-t-m) channel. A p-t-p channel may be more efficient if only a few wireless devices are receiving the service. A p-t-m channel may be more efficient if more wireless devices are receiving the service.

The counting/re-counting procedure utilizes two parameters—a counting flag and an access back-off parameter. The counting flag is a bit that indicates whether counting is enabled or disabled and may also be called a counting indicator, a counting indication, an access flag, and so on. The access back-off parameter controls access to the system for the counting procedure.

To enable the counting procedure for a given service, the system sets the counting flag for that service, which then requests the idle wireless devices receiving that service to establish a Radio Resource Control (RRC) connection with the system. The system periodically sends access information on the MCCH, which is used by the idle wireless devices to trigger the transmission of a signaling message, establishing the RRC connection if necessary. The access information includes the access back-off parameter and possibly other pertinent information. The access back-off parameter defines a probability factor (PF), which indicates the probability with which the wireless devices need to attempt an RRC connection procedure. The access back-off parameter is used to control the loading on the uplink due to the RRC connection establishment requests. This avoids a large number of wireless devices being brought to the RRC connected mode at the same time for counting purposes.

Figure 6:
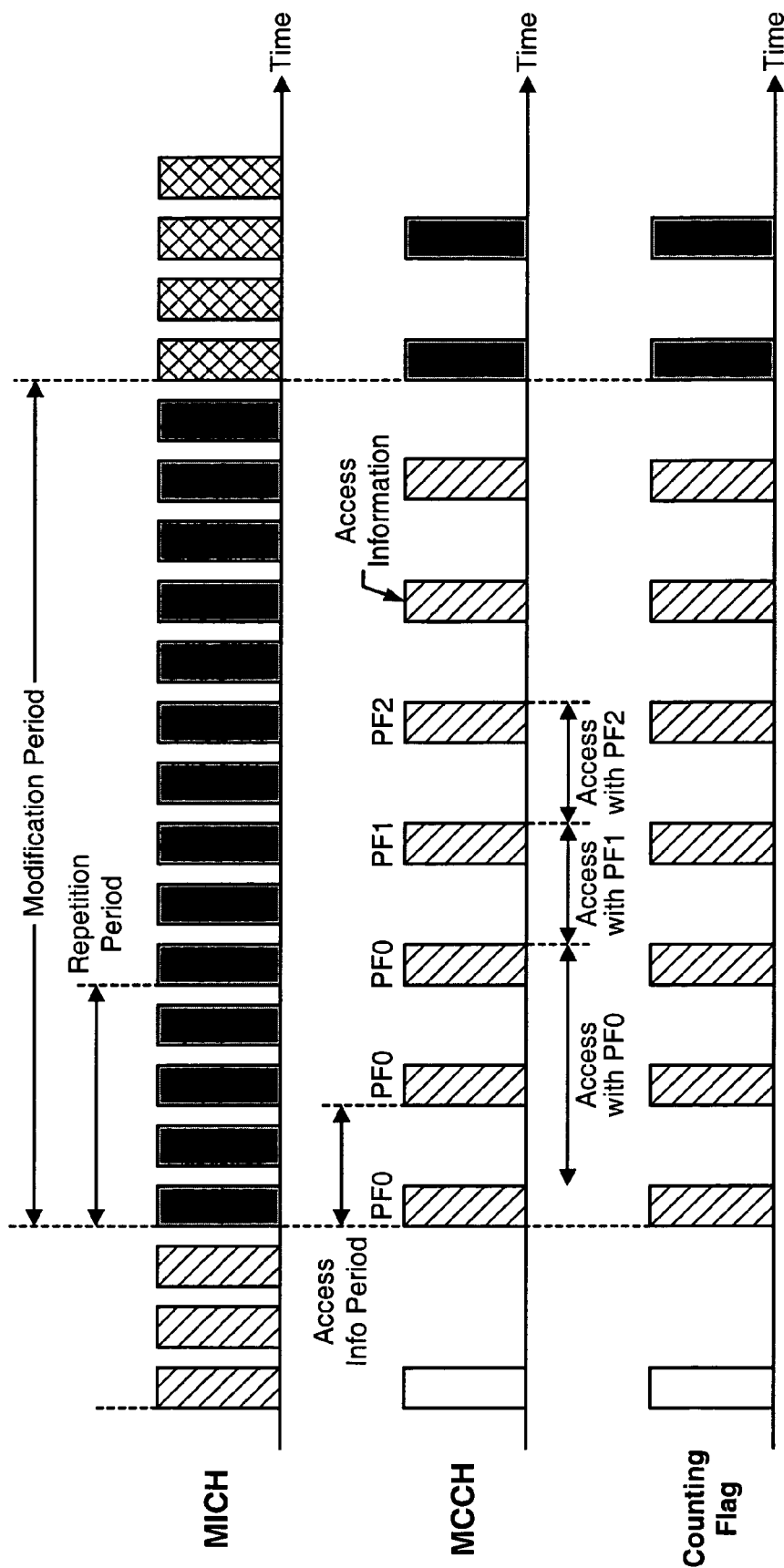
FIG. 6 shows exemplary transmissions on the MICH and MCCH for counting.

FIG. 6 shows exemplary transmissions on the MICH and MCCH for counting. The counting flag for the service is set whenever counting is enabled for the service. The counting flag and the access information may be sent on the MCCH periodically in each access info period. The access info period may be selected such that (1) the access-related information (e.g., the counting flag and the back-off parameter) is transmitted often enough to allow good control of the access procedures and (2) the wireless devices (including new wireless devices that started monitoring the system) are able to receive the access-related information if they follow the MCCH schedule sent on the BCCH. The access info period may be an integer divider of the repetition period to achieve the two goals noted above, or may be defined as any time duration. The access info period schedule is part of the overall MCCH transmission schedule, which is signaled on the BCCH.

The mechanisms described above for sending notification indicators on the MICH and signaling information on the MCCH may also be used for the counting procedure. The counting flag may be set at the start of the modification period, which then limits the counting procedure to be initiated at the start of the modification period. This can simplify the counting procedure since all wireless devices start the access procedure at the same time, which can reduce unpredictable randomness. At each access info period, the access information may be changed and/or the counting flag may be reset. This allows for fast control of the counting procedure and RRC connection establishment.

When a wireless device detects the counting flag being set for a desired service, the device reads the access information and attempts to access the system using the access back-off parameter included in the access information. From that point onward, the wireless device attempts to read the MCCH at every access info period to determine the status of the counting flag and to obtain the latest access information. The wireless device updates the access back-off parameter accordingly. The wireless device continues to read the MCCH in accordance with the access info period until either the counting flag is reset or the wireless device moves to an RRC state in which counting is not required.

Figure 7:
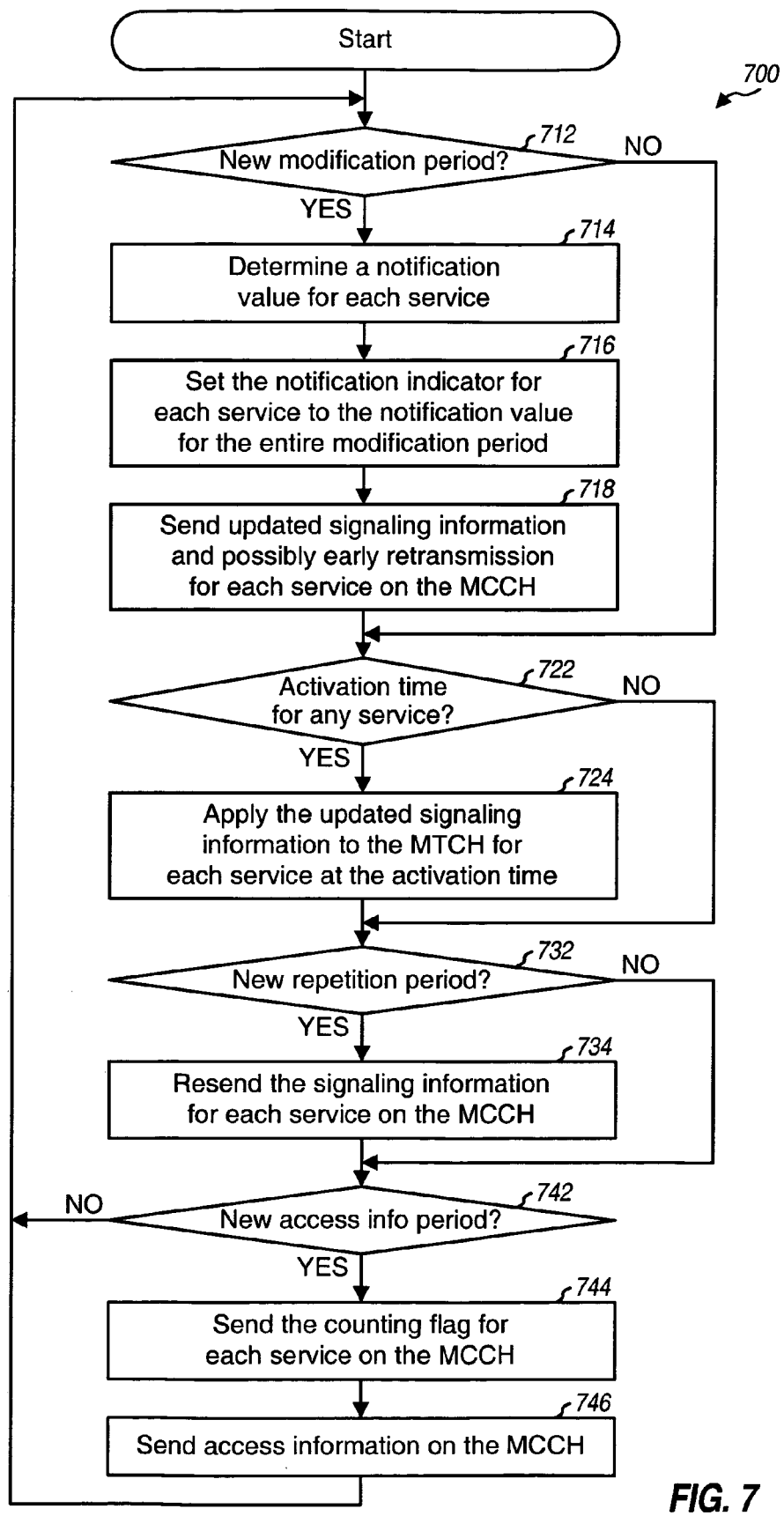
FIG. 7 shows a process for transmitting the MICH, MCCH, and MTCH by a base station.

FIG. 7 shows a process 700 for transmitting the MICH, MCCH, and MTCH by a base station in the system. A determination is made whether a new modification period has commenced (block 712). If the answer is 'Yes', then the notification value for each service is determined based on whether critical signaling information for the service will be changed in the next modification period (block 714). The notification indicator for each service is set in the entire current modification period to the notification value determined for that service (block 716). Updated signaling information (if any) is sent for each service and an early retransmission may also be sent (block 718). If the answer is 'No' for block 712, then the process proceeds to block 722. For each service that is associated with an activation time for its updated signaling information, as determined in block 722, the updated signaling information for that service is applied to the MTCH at the activation time (block 724).

A determination is then made whether a new repetition period has commenced (block 732). If the answer is 'Yes', then the signaling information for each service is resent on the MCCH (block 734). Otherwise, the process proceeds to block 742.

In block 742, a determination is made whether a new access info period has commenced. If the answer is 'Yes', then the counting flag for each service is either maintained set to continue to enable the counting procedure or reset to disable the counting procedure and then sent on the MCCH (block 744). The counting flag may be set at the start of the modification period and may be reset at any access info period. The current access information is also sent on the MCCH (block 746). If the answer is 'No' for block 742 and also after block 746, the process returns to block 712.

As described above, a base station transmits the signaling information for each service in accordance with a schedule that includes, for example, a repetition period, a modification period, and an access info period. The modification period may be an integer multiple of the repetition period, and the access info period may be an integer divider of the repetition period. The base station transmits the signaling information in each repetition period of a current modification period to allow the wireless devices to quickly obtain this information. Any changes to the critical signaling information in the current modification period are transmitted at the start of the next modification period. If changes to the critical signaling information for a given service are transmitted in the next modification period, then a notification indicator for the service is set for the entire current modification period to inform the wireless devices of the impending changes. The wireless devices can detect the notification indicator being set in the current modification period and can then retrieve updated critical signaling information, in the next modification period.

As also described above, the base station may perform a counting procedure for a given service in order to count the number of wireless devices receiving the service and to determine the best transmission mechanism to use for the service. The base station may set a counting flag for each service at the start of a modification period to enable counting for the service. The base station may send the counting flag for each service as well as access information in each access info period. If a wireless device detects the counting flag being set for any service being received by the device, then the wireless device reads the access information and attempts to access the system in accordance with the access information. The access information may be changed and the counting flag may be reset at each access info period.

Figure 8:
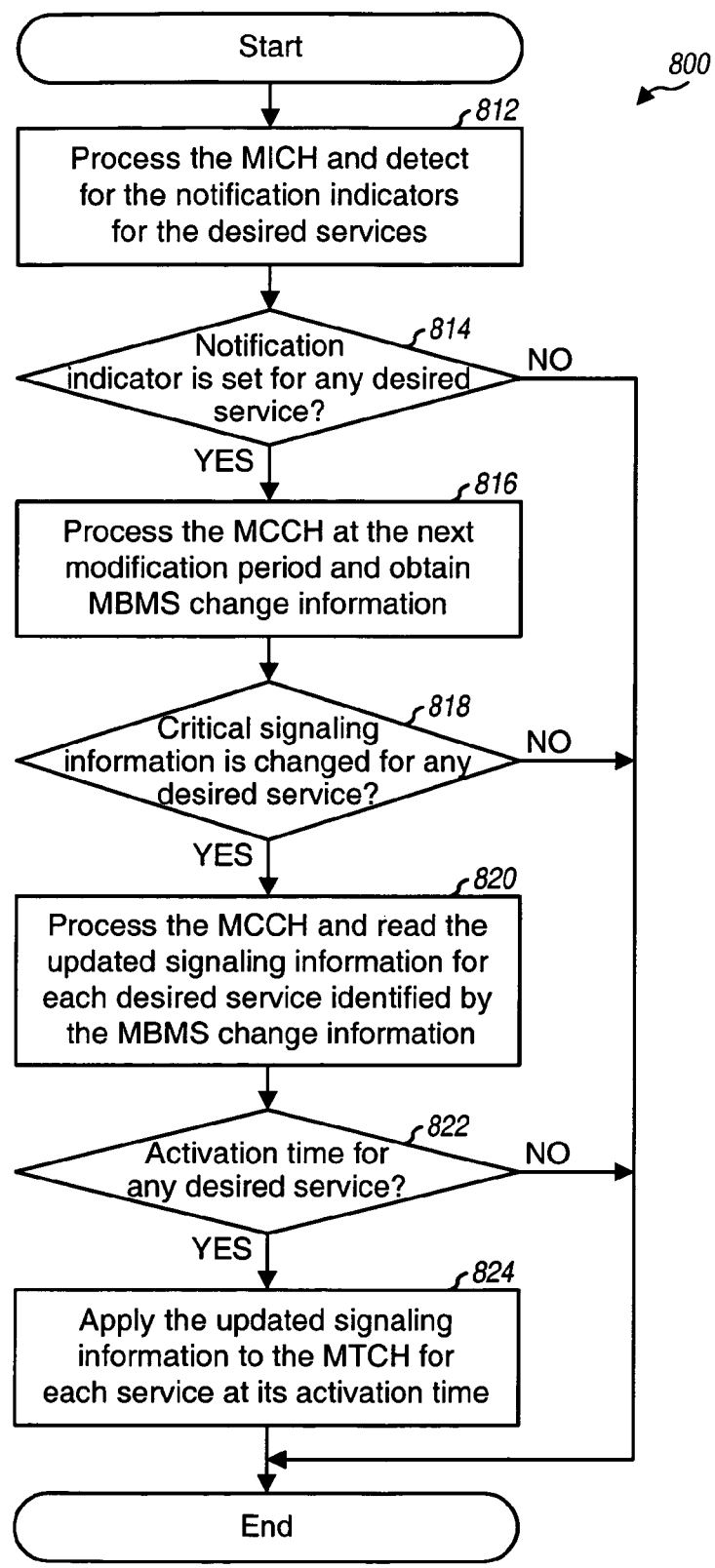
FIG. 8 shows a process for receiving the MICH, MCCH, and MTCH by a wireless device.

FIG. 8 shows a process 800 for receiving the MICH, MCCH, and MFCH by a wireless device. The wireless device processes the MICH and detects for the notification indicators for the desired services (block 812). A determination is then made whether the notification indicator is set for any desired service (block 814). If the answer is 'Yes', then the wireless device processes the MCCH at the next modification period and obtains MBMS change information (block 816). The wireless device then checks the change information to determine whether critical signaling information is changed for any desired service (block 818). If the critical signaling information is changed for any desired service, then the wireless device continues to process the MCCH and reads the updated signaling information for each desired service identified by the change information (block 820). For each service that is associated with an activation time for the updated signaling information, as determined in block 822, the wireless device applies the updated signaling information for that service to the MTCH at the activation time (block 824). The process terminates after block 824 and also if the answer is 'No' for block 814, 818, or 822.

Figure 9:
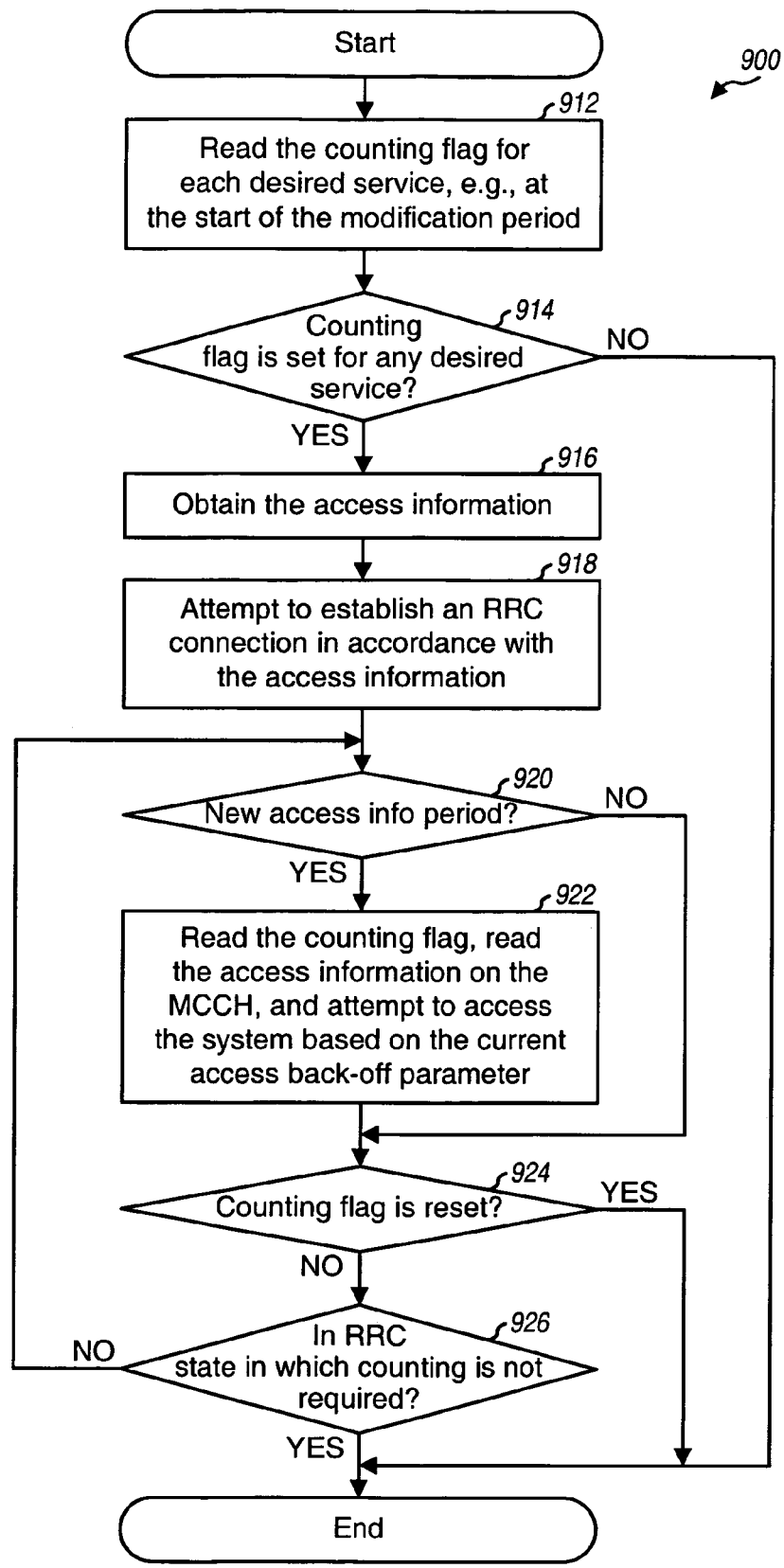
FIG. 9 shows a process for performing counting by the wireless device

FIG. 9 shows a process 900 for performing counting by the wireless device. The wireless device reads the counting flag for each desired service, e.g., at the start of the modification period (block 912). A determination is then made whether the counting flag is set for any desired service (block 914). If the answer is 'Yes', then the wireless device obtains the access information on the MCCH (block 916) and attempts to establish an RRC connection in accordance with the access information (block 918). For each access info period service thereafter, as determined in block 920, the wireless device reads the counting flag, reads the access information on the MCCH, and attempts to access the system based on the current access back-off parameter (block 922). The wireless device continues to read the counting flag and attempt to system access until the counting flag is reset (block 924) or the wireless device has moved to an RRC state in which counting is not required (block 926).

Counting for an on-going service (which is also called re-counting) may be performed in the manner described above in FIG. 9 for counting at the start of a service.

In general, various mechanisms may be used to send notifications for signaling information sent on the MCCH and notifications for the counting procedure. These notifications may be sent (1) on the MICH, as described above, (2) on the S-CCPCH carrying the MTCH, or (3) using dedicated paging. A notification may be sent in-band on the S-CCPCH to notify wireless devices of a re-configuration during an on-going session (e.g. due to the introduction of another service on the same S-CCPCH). The S-CCPCH may be received by wireless devices actively monitoring a service. Sending the notification in-band on the S-CCPCH allows for transmission of additional information along with the notification, such as the actual service ID and/or an activation time. The in-band signaling has a lower false alarm probability at the expense of additional overhead. Dedicated paging is generally applicable to the wireless devices that have established RRC connections.

Transmission of notifications on the MICH and signaling information on the MCCH, as shown in FIGS. 3A through 5, can provide various advantages such as:

Simplify wireless device implementation since the wireless devices know a priori based on the MCCH schedule how long the notification will be sent on the MICH and when it would be useful to read the MCCH;

Allow all or most wireless devices to start listening to the MCCH at the same time, which cuts down on the delay to receive updated MCCH information, allows the activation time to be set close to the modification period boundary, allows for tighter re-transmissions especially at the time where the MCCH information is modified, and eliminates the need to send both old and new configuration information at the same time; and Can be used for all notification scenarios in MBMS and for wireless device in all states (idle and connected).

The wireless devices can read the MICH periodically during their paging occasions (if the devices are idle) or continuously during MTCH reception (if the devices are connected). The notification indicators sent on the MICH potentially has a higher false alarm probability than in-band notification, but this false alarm probability may be reduced by reading the notification indicators more often during the modification period. The additional delay in changing the critical signaling information may be ameliorated by selecting a suitable modification period.

The notification scheme described herein may be used as the main notification mechanism to indicate service start and for counting procedure. This notification scheme may also be used to send notifications during on-going transmissions.

Figure 10:
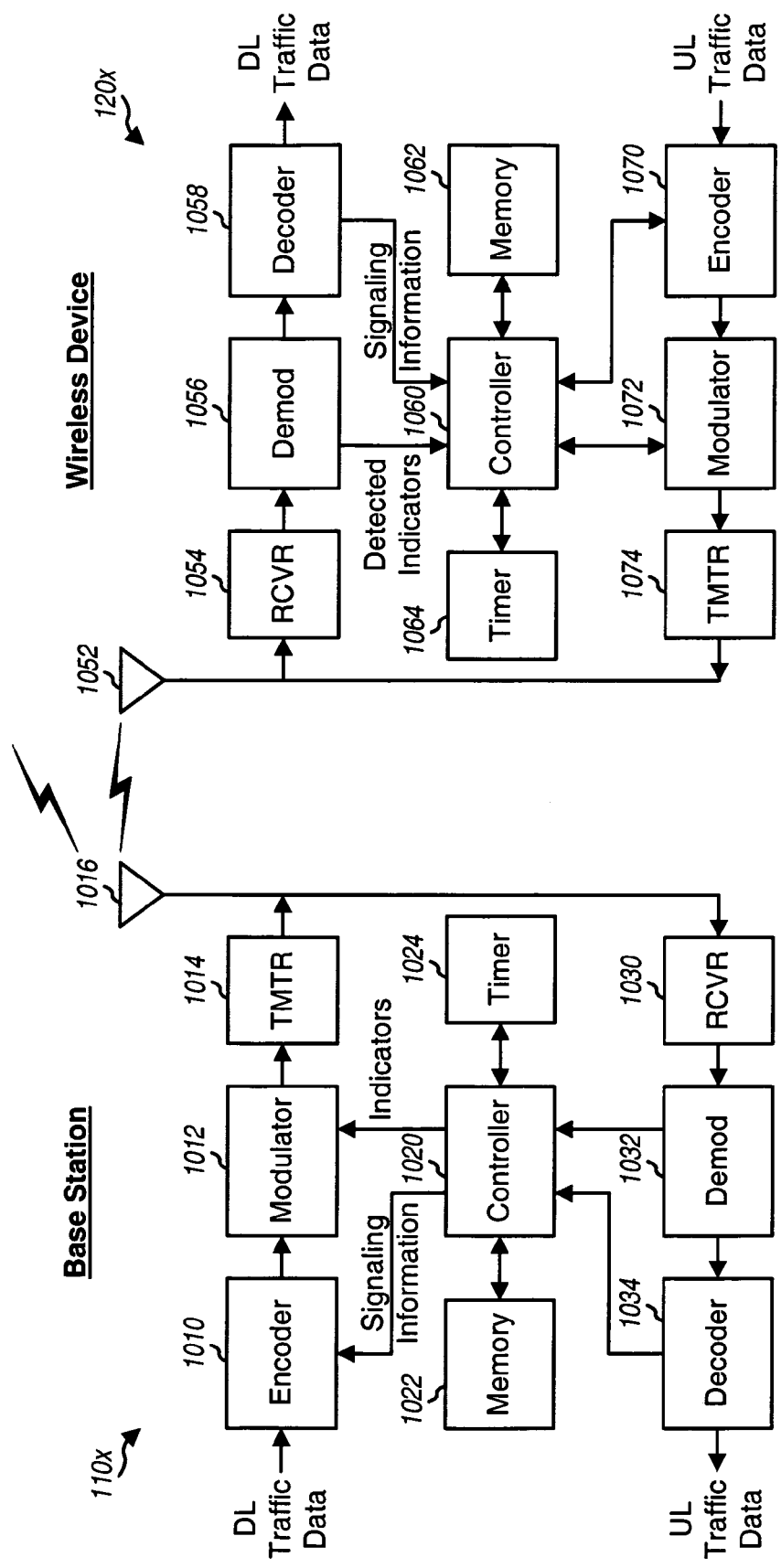
FIG. 10 shows a block diagram of the base station and the wireless device.

FIG. 10 shows a block diagram of an embodiment of a base station 110x and a wireless device 120x. For the downlink, at base station 110x, an encoder 1010 receives traffic data for wireless devices and services, signaling information, and other types of data. Encoder 1010 processes (e.g., encodes, interleaves, and symbol maps) the traffic data and signaling and generates modulation symbols. A modulator 1012 performs channelization, spectral spreading, scrambling, and so on, on the modulation symbols for various physical channels (e.g., the PICH, MICH, and S-CCPCH) and provides a stream of data chips. A transmitter unit (TMTR) 1014 conditions (e.g., converts to analog, amplifies, filters, and frequency upconverts) the data chips and generates a downlink signal, which is transmitted via an antenna 1016.

At wireless device 120x, an antenna 1052 receives the downlink signal from base station 110x and provides a received signal to a receiver unit (RCVR) 1054. Receiver unit 1054 conditions (e.g., filters, amplifies, and frequency downconverts) the received signal, digitizes the conditioned signal, and provides data samples. A demodulator (Demod) 1056 processes the data samples and provides symbol estimates. Demodulator 1056 further performs detection for notification indicators, paging indicators, and counting flags, as directed by a controller 1060. A decoder 1058 processes (e.g., demaps, deinterleaves, and decodes) the symbol estimates and provides decoded data for the transmitted traffic data and signaling sent by base station 110x.

On the uplink, at wireless device 120x, traffic data is processed by an encoder 1070, further processed by a modulator 1072, and conditioned by a transmitter unit 1074 to generate an uplink signal, which is transmitted via antenna 1052. At base station 110x, the uplink signal is received by antenna 1016, conditioned by receiver unit 1030, processed by a demodulator 1032, and further processed by a decoder 1034.

Controllers 1020 and 1060 direct the operation at base station 110x and wireless device 120x, respectively. Controllers 1020 and 1060 may also perform various functions for transmission and reception, respectively, of notification indicators and signaling information for the services. For example, controller 1020 may perform process 700 in FIG. 7 for transmission of signaling information. Controller 1060 may perform process 800 in FIG. 8 for reception of signaling information and process 900 in FIG. 9 for the counting procedure. Memory units 1022 and 1062 store data and program codes for controllers 1020 and 1060, respectively. A timer 1024 provides time information for controller 1020, which uses the time information to maintain the MCCH schedule. A timer 1064 provides time information for controller 1060, which uses the time information to determine when to wake up to process the PICH and MICH as well as to maintain the MCCH schedule.

The signaling transmission techniques described herein may be implemented by various means. For example, these techniques may be implemented in hardware, software, or a combination thereof. For a hardware implementation, the processing units used to transmit signaling information may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to receive signaling information may also be implemented within one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 1022 or 1062 in FIG. 10) and executed by a processor (e.g., controller 1020 or 1060). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a communication system, comprising:
   transmitting a schedule with a repetition period for resending signaling information and a modification period for potentially changing signaling information to user equipments (UEs), the repetition period being periodic, the modification period also being periodic and different from the repetition period, the schedule allowing the UEs to determine both the repetition period and the modification period for signaling information;
   transmitting signaling information for at least one service to the UEs in each of a plurality of repetition periods of a current modification period, the signaling information comprising critical signaling information and non-critical signaling information; and
   transmitting changes to the critical signaling information for the at least one service to the UEs starting at a next modification period.

2. The method of claim 1, further comprising:
   retransmitting the signaling information for the at least one service after a first transmission of the signaling information in a first repetition period and prior to a second repetition period in the current modification period.

3. The method of claim 1, further comprising:
   setting a notification indicator for each service to a predetermined value in the current modification period if changes to the critical signaling information for the service are transmitted in the next modification period.

4. The method of claim 3, further comprising:
   transmitting the notification indicator for each service in each frame in the current modification period.

5. The method of claim 1, further comprising:
   transmitting change information in at least one repetition period of the current modification period, the change information for the current modification period identifying each service with changes to the critical signaling information in the next modification period.

6. The method of claim 1, further comprising:
   sending an activation time for each selected service with changes in the critical signaling information; and
   applying the changes in the critical signaling information for each selected service at the activation time for the selected service.

7. The method of claim 1, further comprising:
   defining the modification period to be an integer multiple of the repetition period.

8. The method of claim 1, further comprising:
   defining the modification period to be equal to or longer than a predetermined minimum duration.

9. An apparatus in a communication system, comprising:
   a transmitter unit operative to transmit a schedule with a repetition period for resending signaling information and a modification period for potentially changing signaling information to user equipments (UEs), the repetition period being periodic, the modification period also being periodic and different from the repetition period, the schedule allowing the UEs to determine both the repetition period and the modification period for the signaling information, to transmit signaling information for at least one service to the UEs in each of a plurality of repetition periods of a current modification period, and to transmit changes to critical signaling information for the at least one service to the UEs starting at a next modification period, the signaling information comprising the critical signaling information and non-critical signaling information; and
   a controller operative to direct transmission of the signaling information by the transmitter unit.

10. The apparatus of claim 9, wherein the controller is further operative to set a notification indicator for each service to a predetermined value in the current modification period if changes to the critical signaling information for the service are transmitted in the next modification period.

11. The apparatus of claim 9, wherein the transmitter unit is further operative to transmit change information in at least one repetition period of the current modification period, the change information for the current modification period identifying each service with changes to the critical signaling information in the next modification period.

12. The apparatus of claim 9, wherein the transmitter unit is further operative to send an activation time for each selected service with changes in the critical signaling information, and wherein the controller is further operative to apply the changes in the critical signaling information for each selected service at the activation time for the selected service.

13. An apparatus in a communication system, comprising:
   means for transmitting a schedule with a repetition period for resending signaling information and a modification period for potentially changing signaling information to user equipments (UEs), the repetition period being periodic, the modification period also being periodic and different from the repetition period, the schedule allowing the UEs to determine both the repetition period and the modification period for the signaling information;
   means for transmitting signaling information for at least one service to the UEs in each of a plurality of repetition periods of a current modification period, the signaling information comprising critical signaling information and non-critical signaling information; and
   means for transmitting changes to the critical signaling information for the at least one service to the UEs starting at a next modification period.

14. The apparatus of claim 13, further comprising:
   means for setting a notification indicator for each service to a predetermined value in the current modification period if changes to the critical signaling information for the service are transmitted in the next modification period.

15. The apparatus of claim 13, further comprising:
   means for transmitting change information in at least one repetition period of the current modification period, the change information for the current modification period identifying each service with changes to the critical signaling information in the next modification period.

16. The apparatus of claim 13, further comprising:
   means for sending an activation time for each selected service with changes in the critical signaling information; and means for applying the changes in the critical signaling information for each selected service at the activation time for the selected service.

17. A method in a communication system, comprising:
setting at least one counting flag for at least one service in a current modification period, wherein a counting flag for each service comprises a bit that indicates whether counting is enabled or disabled for the service and is set at the start of the current modification period if counting is enabled for the service, the current modification period being one of a plurality of periodic modification periods;
transmitting the at least one counting flag in each of a plurality of access info periods in the current modification period; and
transmitting access information for counting in each of the plurality of access info periods in the current modification period, the access information being used by user equipments (UEs) to access the communication system for counting.

18. The method of claim 17, further comprising:
changing the access information, if applicable, at each access info period.

19. The method of claim 17, further comprising:
resetting the counting flag for each service, if applicable, at any access info period.

20. The method of claim 17, further comprising:
defining the access info period to be an integer divider of the modification period.

21. An apparatus in a communication system, comprising:
means for setting at least one counting flag for at least one service in a current modification period, wherein a counting flag for each service comprises a bit that indicates whether counting is enabled or disabled for the service and is set at the start of the current modification period if counting is enabled for the service, the current modification period being one of a plurality of periodic modification periods;
means for transmitting the at least one counting flag in each of a plurality of access info periods in the current modification period; and
means for transmitting access information for counting in each of the plurality of access info periods in the current modification period, the access information being used by user equipments (UEs) to access the communication system for counting.

22. The apparatus of claim 21, further comprising:
means for changing the access information, if applicable, at each access info period.

23. The apparatus of claim 21, further comprising:
means for resetting the counting flag for each service, if applicable, at any access info period.

24. A method, comprising:
detecting at least one counting flag for at least one service in a current modification period, wherein a counting flag for each service comprises a bit that indicates whether counting is enabled or disabled for the service, and wherein the counting flag for each service is transmitted in each of a plurality of access info periods in the current modification period and is set at the start of the current modification period if counting is enabled for the service, the current modification period being one of a plurality of periodic modification periods; and
if the counting flag is set for any service,
receiving access information for counting, wherein the access information is transmitted in each of the plurality of access info periods in the current modification period, and
attempting to access a communication system in accordance with the received access information.

25. A method, comprising:
detecting at least one counting flag for at least one service in a current modification period, wherein a counting flag for each service comprises a bit that indicates whether counting is enabled or disabled for the service, and wherein the counting flag for each service is transmitted in each of a plurality of access info periods in the current modification period and is set at the start of the current modification period if counting is enabled for the service, the current modification period being one of a plurality of periodic modification periods;
if the counting flag is set for any one of the at least one service,
receiving access information for counting, wherein the access information is transmitted in each of the plurality of access info period in the current modification period, and
attempting to access a communication system in accordance with the received access information; and
terminating system access if the at least one counting flag for the at least one service is reset.

26. A method, comprising:
detecting at least one counting flag for at least one service in a current modification period, wherein a counting flag for each service comprises a bit that indicates whether counting is enabled or disabled for the service, and wherein the counting flag for each service is transmitted in each of a plurality of access info periods in the current modification period and is set at the start of the current modification period if counting is enabled for the service, the current modification period being one of a plurality of periodic modification periods;
if the counting flag is set for any one of the at least one service,
receiving access information for counting, wherein the access information is transmitted in each of the plurality of access info periods in the current modification period, and
attempting to access a communication system in accordance with the received access information; and
terminating system access if a connection with the communication system is established.

27. An apparatus in a communication system, comprising:
means for detecting at least one counting flag for at least one service in a current modification period, wherein a counting flag for each service comprises a bit that indicates whether counting is enabled or disabled for the service, and wherein the counting flag for each service is transmitted in each of a plurality of access info periods in the current modification period and is set at the start of the current modification period if counting is enabled for the service, the current modification period being one of a plurality of periodic modification periods;
means for receiving access information for counting if the counting flag is set for any one of the at least one service, wherein the access information is transmitted in each of the plurality of access info periods in the current modification period; and
means for attempting to access the communication system in accordance with the received access information if the counting flag is set for any one of the at least one service.

28. A non-transitory computer-readable medium encoded with instructions capable of being executed by a computer for sending information in a communication system, the computer-readable medium comprising codes executable to:
send a schedule with a repetition period for resending signaling information and a modification period for potentially changing signaling information to user equipments (UEs), the repetition period being periodic, the modification period also being periodic and different from the repetition period, the schedule allowing the UEs to determine both the repetition period and the modification period for signaling information;
send signaling information for at least one service to the UEs in each of a plurality of repetition periods of a current modification period, the signaling information comprising critical signaling information and non-critical signaling information; and
send changes to the critical signaling information for the at least one service to the UEs starting at a next modification period.

29. The non-transitory computer-readable medium of claim 28, further comprising codes executable to:
set a notification indicator for each service to a predetermined value in the current modification period if changes to the critical signaling information for the service are transmitted in the next modification period.

30. The non-transitory computer-readable medium of claim 28, further comprising codes executable to:
send change information in at least one repetition period of the current modification period, the change information for the current modification period identifying each service with changes to the critical signaling information in the next modification period.

31. The non-transitory computer-readable medium of claim 28, further comprising codes executable to:
send an activation time for each selected service with changes in the critical signaling information; and
apply the changes in the critical signaling information for each selected service at the activation time for the selected service.

32. A method in a communication system, comprising:
obtaining, by a user equipment (UE), a schedule with a repetition period for resending signaling information and a modification period for potentially changing signaling information, the repetition period being periodic, the modification period also being periodic and different from the repetition period, the schedule allowing the UE to determine both the repetition period and the modification period for the signaling information;
detecting at least one notification indicator for at least one service in a first modification period, wherein a notification indicator for each service comprises a bit that indicates whether or not critical signaling information for the service is changed, and wherein the notification indicator for each service is transmitted a plurality of times in each modification period and is set in the first modification period if critical signaling information for the service is changed in a second modification period following the first modification period; and
receiving, in the second modification period, the critical signaling information for each service having the notification indicator set in the first modification period.

33. The method of claim 32, further comprising:
determining whether the critical signaling information for any service is associated with an activation time; and
applying the critical signaling information for each service at the activation time, if present.

34. The method of claim 32, further comprising:
receiving change information identifying each service with changes to the critical signaling information in the second modification period; and
receiving the critical signaling information for each service, among the at least one service, identified by the change information.

35. The method of claim 32, further comprising:
waking up in paging occasions assigned to the UE; and
detecting for a paging indicator for the UE in each paging occasion, and wherein the at least one notification indicator for the at least one service is detected in each paging occasion for the UE.

36. An apparatus in a communication system, comprising:
a controller operative to obtain a schedule with a repetition period for resending signaling information and a modification period for potentially changing signaling information, the repetition period being periodic, the modification period also being periodic and different from the repetition period, the schedule allowing the apparatus to determine both the repetition period and the modification period for the signaling information;
a demodulator operative to detect at least one notification indicator for at least one service in a first modification period, wherein a notification indicator for each service comprises a bit that indicates whether or not critical signaling information for the service is changed, and wherein the notification indicator for each service is transmitted a plurality of times in each modification period and is set in the first modification period if critical signaling information for the service is changed in a second modification period following the first modification period; and
a processor operative to receive, in the second modification period, the critical signaling information for each service having the notification indicator set in the first modification period.

37. The apparatus of claim 36, wherein the controller is further operative to determine whether the critical signaling information for any service is associated with an activation time and to apply the critical signaling information for each service at the activation time, if present.

38. The apparatus of claim 36, wherein the processor is operative to receive change information identifying each service with changes to the critical signaling information in the second modification period and to receive the critical signaling information for each service, among the at least one service, identified by the change information.

39. The apparatus of claim 36, further comprising:
a timer operative to indicate paging occasions assigned to the apparatus, and wherein the demodulator is operative to detect for a paging indicator for the apparatus and to detect the at least one notification indicator for the at least one service in each paging occasion for the apparatus.

40. An apparatus in a communication system, comprising:
means for obtaining a schedule with a repetition period for resending signaling information and a modification period for potentially changing signaling formation, the repetition period being periodic, the modification period also being periodic and different from the repetition period, the schedule allowing the apparatus to determine both the repetition period and the modification period for the signaling information;
means for detecting at least one notification indicator for at least one service in a first modification period, wherein a notification indicator for each service comprises a bit that indicates whether or not critical signaling information for the service is changed, and wherein the notification indicator for each service is transmitted a plurality of times in each modification period and is set in the first modification period if critical signaling information for the service is changed in a second modification period following the first modification period; and means for receiving, in the second modification period, the critical signaling information for each service having the notification indicator set in the first modification period.

41. The apparatus of claim 40, further comprising:

means for determining whether the critical signaling information for any service is associated with an activation time; and means for applying the critical signaling information for each service at the activation time, if present.

42. The apparatus of claim 40, further comprising:

means for receiving change information identifying each service with changes to the critical signaling information in the second modification period; and means for receiving the critical signaling information for each service, among the at least one service, identified by the change information.

43. The apparatus of claim 40, further comprising:

means for waking up in paging occasions assigned to the apparatus; and means for detecting for a paging indicator for the apparatus and the at least one notification indicator for the at least one service in each paging occasion for the apparatus.

* * * * *